(12) United States Patent
Raisin et al.

(10) Patent No.: US 11,002,930 B2
(45) Date of Patent: May 11, 2021

(54) MODULAR SYSTEM FOR SECURE AND CONTROLLED ARRANGEMENT OF OPTICAL FIBRES AND COMPONENTS OF AN OPTICAL SYSTEM

(71) Applicant: UNIVERSITAT BERN, Bern (CH)

(72) Inventors: Philippe Richard Raisin, Steffisburg (CH); Christoph Bacher, Bern (CH); Andres Luder Schaible, Muri bei Bern (CH); Manuel Alain Ryser, Bern (CH); Adrian Jenk, Zuchwil (CH)

(73) Assignee: UNIVERSITÄT BERN, Bern (CH)

( * ) Notice: Subject to any disclaimer, the term of this patent is extended or adjusted under 35 U.S.C. 154(b) by 0 days.

(21) Appl. No.: 16/631,612

(22) PCT Filed: Jul. 6, 2018

(86) PCT No.: PCT/EP2018/068447
§ 371 (c)(1),
(2) Date: Jan. 16, 2020

(87) PCT Pub. No.: WO2019/016001
PCT Pub. Date: Jan. 24, 2019

(65) Prior Publication Data
US 2020/0166721 A1 May 28, 2020

(30) Foreign Application Priority Data

Jul. 18, 2017 (EP) .................................... 17181971

(51) Int. Cl.
*G02B 6/44* (2006.01)
*G02B 6/42* (2006.01)
(52) U.S. Cl.
CPC ........... *G02B 6/4452* (2013.01); *G02B 6/426* (2013.01); *G02B 6/4269* (2013.01)

(58) Field of Classification Search
None
See application file for complete search history.

(56) References Cited

U.S. PATENT DOCUMENTS

| 3,912,087 | A | 10/1975 | Zeischegg |
| 8,625,951 | B2 * | 1/2014 | Pimentel .............. G02B 6/4452 385/135 |

(Continued)

FOREIGN PATENT DOCUMENTS

| FR | 2577688 | 8/1986 |
| WO | 2012074982 | 6/2012 |

*Primary Examiner* — Michelle R Connelly
(74) *Attorney, Agent, or Firm* — JMB Davis Ben-David (57) ABSTRACT

The invention relates to a modular and stackable system (1) for arranging an optical fibre of an optical system in a controlled and secure manner, comprising at least the following components: a modular frame (30) comprising a plurality of upright posts (31), wherein the posts (31) are arranged such on the frame (30) that a next-neighbour distance of the posts (31) is identical, wherein each post (31) comprises a recess (31a) on the upper end; at least one module (20) for receiving an optical fibre, wherein the module (20) comprises at least four corners (21); wherein the posts (31) are arranged such that four modules (20) can be arranged with their corners (21) non-overlapping on a single post (31); wherein each module's corner (21) can be fixed with a fixing means on the post (31), wherein the fixing means is designed to engage in the recess (31a) on the upper end of the post (31) and wherein the corners (21) of each module (20) and the fixing means are designed such that the fixing means can simultaneously fix four non-overlappingly arranged modules (20) on a single post (31) of the frame (30). The invention furthermore relates to a fibre laser comprising a modular system (1).

15 Claims, 9 Drawing Sheets

(56) References Cited

U.S. PATENT DOCUMENTS

| | | | |
|---|---|---|---|
| 10,333,272 B2* | 6/2019 | Nishita | H05K 1/0203 |
| 2002/0168167 A1 | 11/2002 | Matsuura | |
| 2004/0074176 A1 | 4/2004 | Baker | |
| 2004/0184745 A1* | 9/2004 | Mynatt | H05K 9/0016 |
| | | | 385/94 |
| 2010/0202740 A1 | 8/2010 | Barlowe et al. | |
| 2013/0266274 A1* | 10/2013 | Little | G02B 6/4269 |
| | | | 385/89 |
| 2015/0160423 A1* | 6/2015 | Droesbeke | G02B 6/4261 |
| | | | 385/92 |
| 2015/0219858 A1 | 8/2015 | Timmins et al. | |
| 2015/0323751 A1* | 11/2015 | Zagoneanu | G02B 6/426 |
| | | | 385/134 |
| 2015/0341066 A1* | 11/2015 | Hsieh | G02B 6/4268 |
| | | | 361/715 |
| 2016/0062064 A1* | 3/2016 | Ishigami | G02B 6/4219 |
| | | | 385/92 |
| 2016/0195684 A1* | 7/2016 | De Bruijn | G02B 6/428 |
| | | | 385/92 |
| 2017/0269318 A1* | 9/2017 | Giraud | G02B 6/4452 |
| 2019/0154936 A1* | 5/2019 | Sedor | G02B 6/4453 |

* cited by examiner

MODULAR SYSTEM FOR SECURE AND CONTROLLED ARRANGEMENT OF OPTICAL FIBRES AND COMPONENTS OF AN OPTICAL SYSTEM

CROSS-REFERENCE TO RELATED APPLICATIONS

This is the U.S. National Stage of International Patent Application No. PCT/EP2018/068447 filed on Jul. 6, 2018, which in turn claims the benefit of European Patent Application No. 17181971.7 filed on Jul. 18, 2017.

The invention relates to a modular system for arranging optical fibres of a fibre optical system in a secure, flexible, and ordered manner as well as a plurality of modules for such a modular system. Fibre optical systems are widely used in the fields of laser systems, light sources, sensor systems and telecommunications.

Fibre lasers systems are widely used in materials processing (e.g. sheet cutting, welding, marking or fine processing), medicine, information technology, and basic research. In recent years, fibre lasers have continuously gained popularity compared to traditional bulk solid-state and gas lasers. The main advantages of fibre lasers are compactness, robustness, low maintenance, energy-efficiency, ease of optical alignment, stable laser parameters, and high beam quality.

Despite the promise of fibre optics to be ultra-portable, flexible and alignment-free, there remain challenging issues when working with fibre optic assemblies.

Given the small diameter of fibres as well as the need for several meters of optical fibres in fibre optic systems, optical fibres quickly proliferate optical tables, creating a considerable mess.

The standard way of resolving this problem is to use the standard fibre spools (e.g. from Thorlabs). These spools are fixed to the optical table, with the fibre optic components placed in between these spools.

Given the additional electronics (i.e. ADCs, photon counters, laser diodes, servomotors, AOMs, etc.), even a compact breadboard setup soon becomes hardly transportable. While portability is usually not a key at the research stage of the project, it's a desired feature to have a more integrated setup to begin with.

An additional detrimental feature of the high proliferation of a fibre on an optical table is the increased risk of destruction of the optical setup.

Destruction can for example happen, when the experimenter accidentally rips the fibre out of a fibre-coupled device.

Thus, particularly for the assembly of a fibre laser the optical fibres are prone to interweaving, rendering fibre laser setups delicate setups.

The problem according to the invention is therefore to provide a system that overcomes the drawbacks associated with the proliferate arrangement of the fibres of an optical system.

This problem is solved by a modular system with the features of claim 1 as well as by a fibre laser according to claim 13 and modules for the modular system according to claims 14 and 15.

Advantageous embodiments are disclosed in the dependent claims and the description.

According to claim 1 a stackable modular system for arranging an optical fibre of an optical system in a controlled manner, comprises at least the following components:

a modular frame comprising a plurality of upright posts, wherein the posts are arranged such on the frame that a next-neighbour distance of the posts is identical, wherein the posts particularly are arranged in squares or hexagons, wherein each post comprises a recess on the upper end, at least one module for receiving an optical fibre, wherein the module comprises at least four, particularly four or six corners, wherein the posts are arranged such that up to four, particularly three or four modules can be arranged next to each other with their corners adjoined on a single post, wherein each module's corner can be repeatedly fixed and released with a fixing means on the post, wherein the fixing means, particularly a screw, is designed to repeatedly engage and disengage in the recess on the upper end of the post, wherein the recess particularly comprises a screw thread, and wherein the fixing means and the corners of each module are designed such that the fixing means can simultaneously fix up to four, particularly three or four, next-to-each-other adjoining arranged modules on a single post of the frame.

Such a modular frame, that can comprise a plurality of modules that are arranged on regularly spaced posts, particularly wherein the posts are arranged in squares, solves the problem according to the invention. As the modules are configured to receive an optical fibre, the optical fibre can be arranged on the modules, and depending on the length of the fibre, the plurality of modules can comprise a suitable number of modules to accommodate the fibre to full extent.

Thus the size of the modular system can be chosen and varied, depending on the specific optical system to be built.

The term "modular" in the context of the specification relates to the property of the system that it can be assembled by a plurality of similar or identical components.

The modular system can be assembled by a plurality of posts and modules.

The term "fibre" and the phrase "optical fibre" are used synonymously in the application that is, a fibre is an optical fibre.

The term "non-overlapping", or "adjoining" refers to the feature of the modular system that the modules can be arranged next to each other on the posts, but in a manner that the modules are particularly arranged coplanar and on the same level.

In the assembled state of the modular system adjacent and adjoining modules do not cover each other. The corners of coplanar and adjacent modules are particularly not stacked. Therefore the geometry of the modules and corners is particularly such that they can form a tessellation. The tessellation can be a rectangular, square or a hexagonal tessellation.

The fixing means is designed to fix all adjoining corners on a single post. Thus, the fixing means is covering at least a part of the corner of the module, when the module is fixed on the modular frame.

The frame is particularly configured to be placed on a horizontal, planar surface, such that the posts are facing upwards, i.e. the posts are arranged orthogonally to said surface.

The horizontal surface can be used as a Cartesian coordinate system, wherein the surface spans the x-y plane, and the posts are oriented along the z-axis.

The at least one module is particularly parallel to the horizontal surface, i.e. along the x-y plane.

The modules of the system therefore can have particularly a hexagonal or a rectangular outline. In case the modules have a hexagonal outline, the posts are configured to receive three corners of the three different modules, wherein when the modules have a rectangular outline, the posts are configured to receive four corners of four different modules.

According to an embodiment of the invention, the modular frame and the at least one module comprises or is a metal, particularly aluminium, copper or steel, particularly stainless steel.

Metal provides stability and the components of the modular system can be manufactured comparably easy and with high accuracy. Particularly aluminium provides good thermal and handling properties.

Particularly modules that are designed to dissipate heat are made of metal or comprise metal.

According to another embodiment of the invention, the at least one module or module support member comprises or consists of a polymer, particularly a polymer for heat insulation, more particularly Polyoxymethylen ([CAS-Nr 9002-81-7), Polyethylen (CAS-N r: 9002-88-4), and/or Polypropylen (CAS-Nr 9003-07-0).

A module comprising or consisting of such a polymer can be used for heat-insulating purposes, where for example a hot or warm component arranged on such a module should be thermally insulated and stabilized. The polymer prevents heat dissipation via heat conduction such that the component can be kept at a desired temperature more easily as if the module would be comprise or consist of metal.

According to another embodiment of the invention, each module comprises four corners and wherein the modules and the posts are designed such that four modules can be arranged with their corners in a non-overlapping, which is in an adjoining manner on a single post.

This embodiment provides an essentially rectangular or square geometry for the modules, to be placed on the posts.

According to another embodiment of the invention, the posts are equally spaced along an x- and y-direction of the frame, wherein the x- and y-directions are orthogonal to the direction of extent of the posts as well as with respect to each other.

As mentioned above, the x- and y-direction are particularly extending in the x-y plane of the horizontal surface the frame is placed on.

According to another embodiment of the invention, the posts are arranged in a regular grid, such that a plurality of modules of the at least one module can be arranged in a regular pattern, particularly as a tessellation on the posts, particularly in a rectangular, square or hexagonal fashion, particularly in at least two rows and two columns.

According to another embodiment of the invention, the sides of the at least one module each enclose an angle of 90° or 120° with each other forming an essentially rectangular or a hexagonal module and wherein the sides of the at least one module are particularly of the same length forming essentially a square or a regular hexagon.

According to another embodiment of the invention, the fixing means is a screw and each corner of the module comprises a quarter or a third circle segment cutout, wherein the cutout is arranged around the recess of the post, when the module is arranged and particularly fixed on the frame.

Using a screw as a fixing means allows the repeated fixing and releasing of the modules on the post. For this reason, the corners of the module are shaped such (comprising a cutout) that the screw can engage in the threaded recess of the post.

Furthermore, the corners can comprise a recess around the cutout, wherein said circular recess is also circular shaped, such that the screw head can be sunk in said recess.

According to another embodiment of the invention, the frame comprises straight and elongated module-support members, wherein the module-support members are arranged with an elongated direction of extension in the frame along a horizontal direction, particularly the x- or y-direction, of the frame, wherein at least two posts are arranged upright on each module-support member, particularly oriented along the z-axis of the frame (orthogonal to the horizontal surface).

A module-support member is particularly a support beam for the modules, wherein the posts are arranged orthogonally on said support beam, facing upwards.

The elongated direction of extension is particularly oriented along the support beam.

The x-axis of the frame and the y-axis of the frame are interchangeable.

According to a further development of the embodiment, each module-support member comprises a rotational-symmetric cross-section profile within any cross-section orthogonal to the direction of extent of the posts, wherein the rotational symmetry is particularly a point reflection.

This design of a module support member allows for the implementation of the modular concept of the system, as the symmetric layout of the module-support members allows an almost arbitrary continuation of the modules.

The term "rotational symmetric" in the context of the specification refers to a two-dimensional rotational symmetry, particularly a two-dimensional point reflection in the x-y plane or the corresponding parallel cross-section.

According to another embodiment of the invention, each module-support member comprises an elongated section extending along the elongated direction of extension of the module-support member, wherein the elongated section comprises a first connection-section at a first end of the elongated section and a second connection-section at a second end of the elongated section, wherein the first and second connection-section are formed complementary to each other particularly such that when the first connection-section of a first module-support member of the plurality of module-support members and the second connection section of a second module-support member of the plurality of module-support members are connected, a combined module-support member is formed that extends straight along the elongated direction of extension of the first and second module-support member.

This way of combining the module-support members provides a modularity of the modular system.

In continuation of this embodiment, the first and the second connection section each comprise two openings arranged next to each other along the elongated direction of extension for one or two connection means.

The openings are particularly arranged such that a connection means is oriented along the y- or x-direction when the two connection sections are connected with each other.

This can be facilitated by connection sections that are formed as recesses at the ends of the elongated sections.

The openings particularly comprise threads, such that the connection means can be one or two screws.

According to another embodiment of the invention, the at least one module comprises a lower, particularly planar surface facing towards the module support member, wherein the at least one module comprises a recess or a threaded recess on the lower surface that is configured for attaching electronic components, particularly a photodiode circuit, a control circuitry for motors, a temperature control system, and/or a thermoelectric cooling or heating system to the lower surface of the module.

According to another embodiment of the invention, the frame has frame-support members that are arranged such at the frame that the frame-support members extend lower than the module-support members, such that the frame can be mounted on the frame-support members only, such that the module-support members do not touch a planar mounting surface.

In this embodiment only the frame-support members touch the particularly horizontal surface where the frame is placed, such that the module-support members of the frame are above the surface, i.e. they are not touching the ground.

This embodiment allows for better circulation of air and thus for an improved heat dissipation of the system.

Moreover, the resulting space underneath and above the module can be used to attach all sorts of electronics, such as photodiode circuits, control circuitry for motors, cooling equipment, such as water-based cooling systems, thermoelectric cooling, and/or fans.

In conventional setups these components have to be arranged on the table top and consume valuable space that is not available anymore for optical components.

Another advantage of the components all attached firmly to the modular grid and being arranged in levels is that the whole assembly can be flipped over, in order to access and modify or repair components.

In addition, this way a very clear separation of optical components and other components such as electronic components in terms of levels is provided: On top of the modules, the optical components can be arranged and underneath the modules the cooling components and/or electronics. This should also simplify working and designing fibre systems.

Furthermore, this embodiment provides a reduced area of support for the frame, such that the frame can be mounted comparably easy on various devices, or housings.

The surface can be for example an optical table or a bread board.

According to another embodiment of the invention, each frame-support member comprises an elongated section, wherein the elongated section comprises a first frame-support member connection section at a first end of the elongated section of the frame-support member and a second frame-support member connection section at a second end of the elongated section of the frame-support member, wherein the first and second frame-support connection section are formed complementary to each other particularly such that when the first frame-support member connection section of a first frame-support member and the second connection section of a second frame-support member are connected, a combined frame-support member is formed that extends straight along an elongated direction of extent of the first and second frame-support member.

This embodiment allows for a flexible length of the system.

According to another embodiment of the invention, the system comprises a plurality of frames that are arranged on top of each other, particularly along the z-direction of the system, wherein the plurality of frames, particularly the frame support members, comprise at least one recess on its upper and lower side, designed for engaging with a frame connection member, particularly a pin or a screw, when a first frame of the plurality of frames or particularly a frame support member of the first frame, is arranged on top of a second frame of the plurality of frames, particularly a frame support member of the second frame.

According to another embodiment of the invention, the at least one module is rotation-symmetric, with respect to its surface plane.

The rotational symmetry of the module, e.g. a 90° symmetry or a 180° symmetry (point symmetry) allows for a flexible layout of the modular system and the fibre arrangement on the module.

According to another embodiment of the invention, the at least one module comprises a planar, rotation-symmetric upper surface comprising particularly upright protruding elements, wherein said protruding elements form fibre-guiding recesses for arranging and guiding an optical fibre, wherein the protruding elements are arranged and particularly shaped rotation-symmetrically with respect to the centre of the surface plane of the module or symmetrically with respect to at least one axis of symmetry of the at least one module.

As the module comprises protruding elements, a fibre can be wrapped around and arranged in the fibre-guiding recesses.

The symmetry of the layout on the module surface contributes to the modular concept of the system, as the modules can be assembled regardless of their orientation.

In a continuation of the embodiment, at least one of the protruding elements comprises a restraining-protrusion at an upper end extending at least partially over the fibre-guiding recess for restraining an optical fibre in the fibre-guiding recesses.

This embodiment allows for an enduring arrangement of an optical fibre on the system. The restraining recesses particularly keep a fibre below the height of the protruding elements, such that the fibre particularly does not stick out of the module along the z-direction.

According to another embodiment of the invention, wherein the at least one module comprises at least two connection-recesses on each side of the module, wherein the connection-recesses are designed to receive and relay an optical fibre to a connection-recess of an adjacent module on the frame, wherein the at least two connection-recesses on each side are arranged symmetrically with respect to the middle of the side, particularly at the corners.

The connection recesses are arranged such that the fibre is bent or guided on the module, wherein it is possible to arrange the connection recesses at the corners, so that the fibre can be bent form there on inwards and over the module surface in order to take advantage of the full area of the module.

Thus, the phrase "at the corner" in the context of the current description refers to the connection recesses being arranged in a section extending from the corner along the side of the module, wherein the length of the section is less than 10% of the side length of the module, particularly less than 5%.

According to another embodiment of the invention, a first kind of module of the at least one module has equally long sides at an angle of 90°, that is the module is essentially square, wherein each side has three connection-recesses, wherein a middle connection-recess is arranged at the middle of the side and two outer connection-recesses of the three connection-recesses are arranged symmetrically to the middle connection-recess, particularly at the corners, wherein the fibre-guiding recesses are connected to the connecting-recesses, wherein the fibre-guiding recesses are formed at least partially as channels, each following an arc, particularly a quarter circle segment, such that a fibre can be arranged and guided along said arc, wherein at least one arc connects with a first end to one of the outer connection recesses and ends with a second end in the centre of the module surface, and/or at least one arc connects with its ends to the middle connection recesses of two adjacent sides, and wherein the module particularly comprises fibre-guiding recesses that connect the middle connection-recesses of opposite sides along a straight line.

An arc has particularly a curvature that is either positive or negative, and at most a zero curvature at its ends. The arc has particularly no turning point where the curvature changes sign.

It is clear that the first kind of module can comprise a plurality of such arcs, therefore forming a symmetric surface layout and providing a multitude of fibre guiding options on the module's surface. In case all possible arcs falling under the above embodiment a flower like recess-structure is achieved on the module's surface. This embodiment is therefore also referred to as the "flower"-module.

The protruding elements, that form these arcs and fibre-guiding recesses, particularly comprise some restraining protrusions.

According to another embodiment of the invention, a second kind of module of the at least one module has two long opposing sides and two opposing short sides at 90°, wherein the long sides are twice as long as the short sides such that they form a rectangular module, wherein the protruding elements are arranged such on the surface of the second kind of module that an optical fibre can be wrapped particularly many times and guided along a path that has the shape of an eight, wherein particularly the long sides each have four connection-recesses arranged symmetrically around the middle of the side, wherein two outer connection-recesses are arranged at the corners.

The connection recesses arranged around the middle of the side are particularly arranged in sections around the middle such that if the module would be cut in half at the middle, said connection-recesses would be arranged at the corner, i.e. they have particularly the same distance from the middle, as the outer connection-recesses have from the corner.

This way it is assured that the inter-module fibre-connectivity of the connection-recesses is maintained, even if modules of the first kind (square) and the second kind (rectangular) are mixed on the modules system.

The second kind of module provides the option to wrap a fibre particularly multiple times around the protruding elements, such that the fibre is essentially spooled in the form of eights on the module.

Furthermore, the module is particularly designed such that the length of the fibre protruding from the fibre connection recess can be adjusted continuously in order to compensate for excess fibre. This is particularly important if the neighbouring module contains a fixed fibre-optical element such as a wavelength division multiplexer (WDM).

The second kind of module is particularly designed such that each fibre connection recess of the second kind of module can be reached by a fibre arranged on the module from any other fibre connection recess on the same module by the fibre without the fibre being kinked. For example, if the fibre is inserted at a specific fibre connection recess to the module, the fibre can be guided through the module, and particularly through the various recesses, such that it can exit the module at any other, particularly even the same, fibre connection recess with being bent too much or even kinked.

This design allows for particularly high flexibility of fibre layouts.

The problem according to the invention is furthermore solved by a fibre laser comprising an optical fibre, an active medium, and the modular system according to the invention, wherein the fibre is arranged on a plurality of modules on the modular system.

The problem according to the invention is also solved by a fibre optic system assembly, particularly an optical tomography device, a fibre sensing and detection device and/or a fibre-based light source, comprising an optical fibre and fibre optic components, particularly from the group of an active medium, a fibre-optic isolator, a fibre-optic coupler, a wavelength division multiplexing element, an inline polarizer, a laser diode, a pump-signal combiner, the fibre optic system assembly further comprising the modular system according to one of the preceding claims, wherein the fibre connecting the fibre-optic components is arranged on a plurality of modules on the modular system. The problem is furthermore solved by a module for a modular system according to the invention, wherein the sides of the module enclose an angle of 90° and are of the same length forming essentially a square, wherein the module comprises four corners, wherein each corner of the module comprises a quarter circle segment cutout, wherein the module comprises a planar upper surface comprising particularly upright protruding elements, wherein said protruding elements form fibre-guiding recesses on the upper surface of the module for guiding an optical fibre, wherein the protruding elements are arranged and/or designed rotation-symmetrically with respect to the centre of the surface plane of the module or symmetrically with respect to at least one axis of symmetry of the at least one module, wherein the module comprises three connection-recesses on each side of the module to relay an optical fibre to connection-recesses of an adjacent module, wherein a middle connection-recess is in the middle of the side and two outer connection-recesses are arranged symmetrically to the middle connection-recess, particularly at the corners, wherein the fibre-guiding recesses connect to the connection-recesses, wherein the fibre-guiding recesses are formed at least partially as channels, each following an arc, particularly a quarter circle segment, such that a fibre can be arranged and guided along the arc, wherein at least one arc connects with a first end to one of the outer connection recesses and ends with a second end in the centre of the module surface, and/or at least one arc connects with its ends to the middle connection recesses of two adjacent sides, and wherein the module particularly comprises fibre-guiding recesses that connect the middle connection-recesses of opposite sides along a straight line.

This module essentially corresponds to the "flower"-module.

The problem is solved also by another module for a modular system according to the invention, wherein the module has two long opposing sides and two opposing short sides each at 90°, wherein the long sides are twice as long as the short sides such that the module is essentially rectangular, wherein the module comprises four corners, wherein each corner of the module comprises a quarter circle segment cutout, wherein the module comprises a planar upper surface comprising particularly upright protruding elements, wherein said protruding elements form fibre-guiding recesses on the upper surface of the module for arranging and relaying an optical fibre, wherein the protruding elements are arranged rotation-symmetrically with respect to the surface plane of the module or symmetrically with respect to at least one axis of symmetry of the at least one module, wherein the protruding elements are designed and arranged such on the surface of the module that a fibre can be wrapped particularly multiple times along a path that has the shape of an eight, wherein particularly the long sides each have four connection-recesses arranged symmetrically around the middle of the side, wherein two outer connection-recesses are arranged next to the corners of the module.

It is noted that for modules for the modular system that are designed for receiving an optical fibre and that comprises connection recesses the connection recesses are designed for receiving a fibre, wherein the fibre is introduced to the module by the connection recess. The fibre can exit the module via a connection recess and enter an adjacent module via the corresponding connection recesses.

The fibre-guiding recesses are particularly formed such that the fibre can be arranged in the recesses without kinking the fibre, but that the fibre is more or less continuously bent. For this reason the fibre-guiding recesses are particularly formed such that any arc-shaped recess connects tangentially to a connection-recess.

In particular, the fibre-guiding recesses comply with the minimal bending radii for fibres. For standard single-mode fibres, this means a bending radius of 25 mm. However, the design can easily be adapted to fibres with larger and smaller acceptable bending radii.

For a square module, the sides have a length of particularly 62.5 mm. A rectangular module is particularly 125.0 mm long and 62.5 mm in width.

Further features and advantages of the invention shall be described by means of a detailed description of embodiments with reference to the Figures, wherein it is shown in FIG. 1 a plain module according to the invention;

FIG. 8 a module support member according to the invention;

Figure 1:
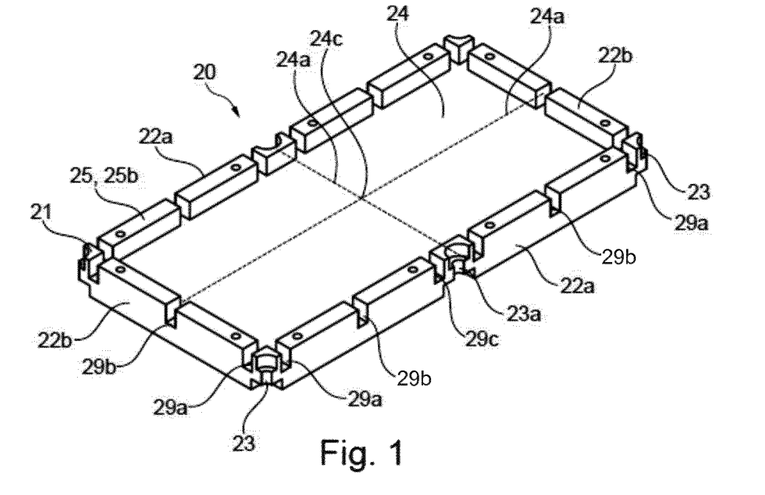

FIG. 1 shows an oblique view of a plain module 20 according to the invention. The plain module 20 comprises two opposing long sides 22a that are twice as long as the short sides 22b such that they form a rectangular module 20.

On the sides 22a, 22b of the module 20 a circumferential edge 25b, particularly in form of upright protrusions 25, is located.

The edge 25b encompasses a planar surface 24 of the module 20 that is configured to receive optical or electronical components.

Said edge 25b is interjected by connection recesses 29a, 29b, 29c of the module 20 that form leveled openings to the planar surface 24 of the module 20.

Each of the long sides 22a exhibits six connecting recesses 29a, 29c for an optical fibre, and each of the short sides comprises three connecting 29a, 29b recesses for the optical fibre.

The four corners 21 of the module 20 are formed each by a quarter circle segment cutout 23 that is configured and designed to be attached with the modular system 1 with a fixing means, such as a screw. When the module 20 is fixed on the modular system 1, the quarter segment cutouts 23 are pressed down to a post 31 by the screw head of the screw.

In the middle of the module's long sides 22a are half circle segments cutouts 23a, which can be used for attaching the module to posts 31 as well. Also here, these cutouts 23a are designed such that a screw head can press them down on a post 31 such that they are fixed to the post 31 and thus to the modular system 1.

The module 20, as all modules shown in the Figures, is made of a metal or a polymer, depending on its purpose as elaborated above.

The long side 22a of the module 20 is 125 mm long, wherein the short sides 22b are 62.5 mm long.

Figure 2:
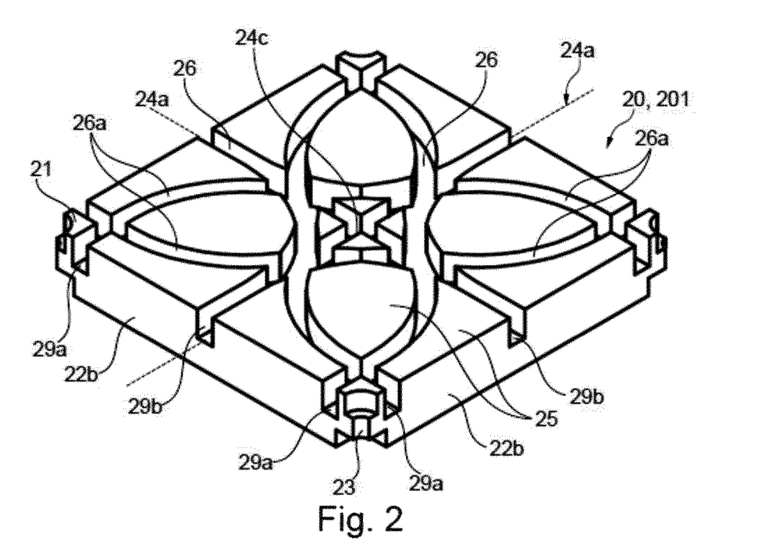
FIG. 2 a first kind of module according to the invention.

FIG. 2 is an oblique view of the first kind of module 201 for receiving an optical fibre, the so-called "flower module". The module 201 is essentially square, wherein each side 22b has three connection-recesses 29a, 29b. Two outer connection recesses 29a are arranged at the corners 21 and a middle connection recess 29b is arranged in the middle of the side 22b.

The corners 21 of the module 20 are formed each by a quarter circle segment cutout 23 which can be attached with the modular system 1, as described in FIG. 1 already.

The module 201 has eight arc-shaped guiding-recesses 26a. The arc-shaped fibre-guiding recesses 26a each connect with a first end to a connection recess 29a at one of the corners 21 (the module 201 comprises eight connection recesses 29a at the corners 21) and end with a second end in a central area (around the centre 24c) of the module 201.

The central area comprises the geometrical centre 24c of the module 201 and extends circularly particularly with a diameter of 30% of the side length around said centre 24c.

The "flower" module 201 furthermore comprises two straight fibre-guiding recesses 26 in form of channels, connecting the connection recesses 29b in the middle and crossing each other orthogonally in the module's 201 centre 24c.

The rotational symmetry of the module 201 allows for a flexible layout of the modular system 1 and the fibre arrangement on the module 201.

All recesses 26, 26a of the "flower" module are coplanar with the recesses 29a, 29b, 29c of the module 20 from FIG. 1 and are on the same level as the planar surface 24 of the module 20 of FIG. 1.

The fibre-guiding recesses 26, 26a of the "flower" module 201 are formed by upright protruding elements 25 that protrude 5 mm from a surface that corresponds to the bottom of the fibre-guiding recesses 26, 26c of the module 201.

Figure 3:
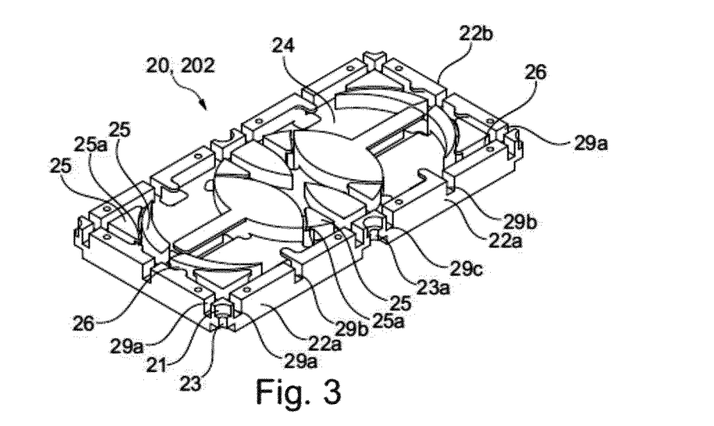
FIG. 3 a second kind of module according to the invention.

FIG. 3. is an oblique view of the second kind of module 202 for receiving an optical fibre according to the invention.

The module 202 is rectangular, with two long opposing sides 22a and two short opposing sides 22b, wherein the long sides 22a are twice as long as the short sides 22b. Protruding elements 25 are arranged such on the surface 24 of the module 202 that an optical fibre can be wrapped many times and guided along a path that has the shape of an eight, wherein the long sides 22a each have four connection-recesses 29a, 29c arranged symmetrically around the middle of the side 29a, wherein two outer connection-recesses 29a are arranged at the corners 21.

The connection recesses 29c in the middle of the module 202 are arranged such that they form a continuous recess with connection recesses 29a of a square module 20, 201 with four short sides 22b (e.g. a module from FIG. 2) that has its connections recesses 29a arranged at its corners 21.

This way it is possible to arrange the module 202 next to a square module 20, 201 and maintain fibre connectivity throughout the modules 20, 201, 202, even if the modules 20, 201, 202 are of different shape.

The module 202 of the second kind also has straight fibre-guiding recesses 26 that form straight channels for receiving and guiding a fibre from one connection recess 29a to an opposing connection recess 29a.

The corners 21 of the module are formed each by a quarter circle segment cutout 23 which can be attached with the modular system 1.

In the middle of the module's long sides 22a are half circle segments cutouts 23a, which can be used for attaching with the modular system 1, as described in FIG. 1.

The rotational symmetry of the module 202 allows for a flexible layout of the modular system 1 and the fibre arrangement on the module 202.

The fibre-guiding recesses 26 of the second kind of module 2020 are formed by upright protruding elements 25 that protrude 5 mm from a surface that is given by the bottom of the fibre-guiding recesses 26 of the module 202.

Furthermore, some of the protruding elements 25 comprise restraining protrusions 25a at their upper end that extend in a plane parallel to the surface plane 24 of the module 202, such that they can hinder a fibre from sticking out of the module 202 above the upright protrusions 25.

Figure 4:
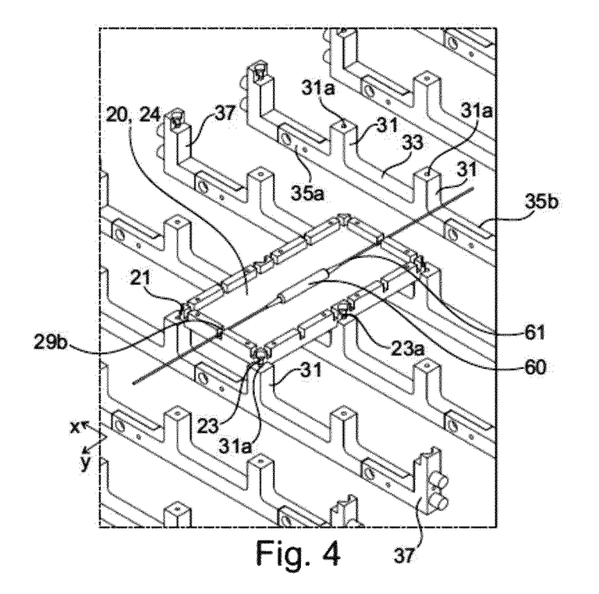
FIG. 4 a modular system with a tube-like packaged fibre-optical element, (e.g. a filter, an isolator, a wavelength division multiplexer, a circulator, a polarizer, a coupler etc.) according to the invention.

FIG. 4 shows an oblique view of a fibre-optical element 60, arranged on a module 20 according to FIG. 1, which is attached to the modular system 1. The tube-like packaged fibre-optical element 60 is connected by fibres 61 that are guided through the connection recesses 29b in the middle of the module's short sides 22b.

The module's corners 21 (quarter circle segment cutouts 23) and the module's half circle segments cutouts 23a (in the middle of the long sides 22a) are placed on the posts 31 that are integrally part of a module support members 33 in a way, that only a fourth or the half of the posts' area is engaged (which means that there is enough space for attaching other modules at the same posts 31).

The module support members 33 extend along an x-axis of the modular system 1, and are arranged in rows extending along the x-axis, wherein the rows are arranged parallel along the y-axis.

The rows of the module support members 33 have a fixed and constant distance along the y-axis to each other. The distance between the rows is such that the distance between two next-neighbour posts 31 along the y-axis is the same as the distance between the two adjacent posts 31 along the x-axis. The posts 31 are therefore arranged on a regular square grid in the x-y plane.

The module-support members 33 are designed such that they can be modular connected with each other to form a combined module support member. The distance between the posts 31 on the combined module support member is constant for all posts.

At the end of each combined module support member (comprising a plurality of module support members) the combined module support member is attached with a grid-side-to-centre member 37 to a frame-support member 36 in a manner that the combined module-support member does not touch the mounting surface for the modular system 1.

Figure 5:
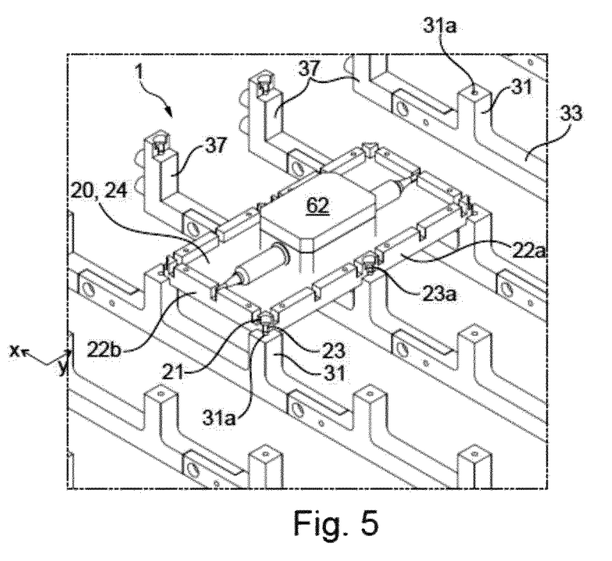
FIG. 5 a modular system with an box-like packaged fibre-optical element (e.g. a filter, an isolator, a wavelength division multiplexer, a circulator, a polarizer, a coupler etc.) according to the invention.

FIG. 5 is an oblique view of a box-like packaged fibre-optical element 62, arranged on a module 20 as shown in FIG. 1.

The fibre-optical element 62 is led with its inputs and outputs through the connection-recesses 29b for the optical fibre 60 in the middle of the module's short sides 22b. The module's corners 21 (quarter circle segment cutouts 23) and the module's half circle segments 23a cutouts (in the middle of the long sides 22a) are placed on the posts 31 of the module support members 33 in a way, that only a fourth or the half of the posts' area is engaged (which means that there is enough space for attaching other modules at the same posts 31).

The grid-side-to-centre members 37 are used to connect the frame-support members 36 with the module-support members 33 and the module 20 (in this figure the component holder).

Figure 6:
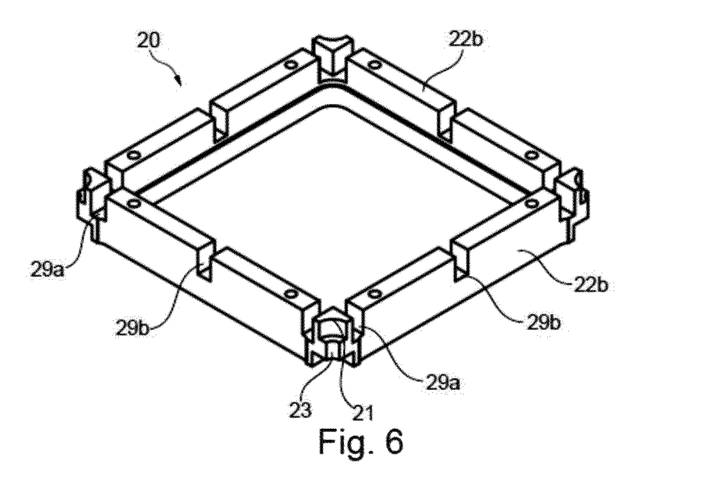
FIG. 6 a square thermally insulating module according to the invention.
Figure 7:
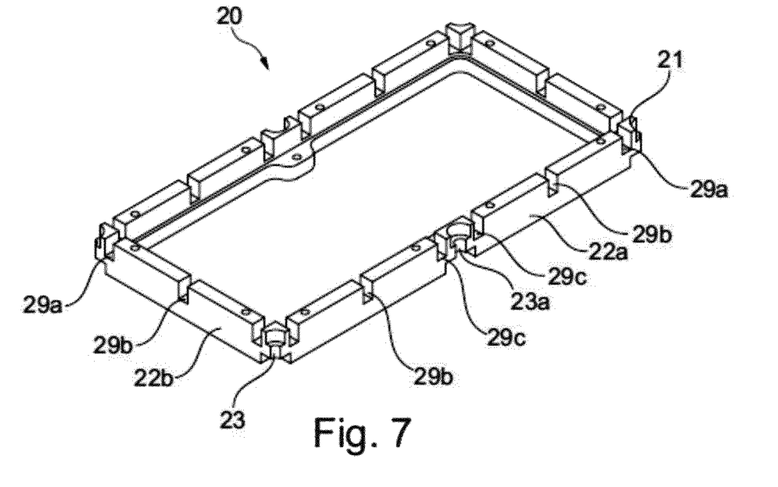
FIG. 7 a rectangular thermally insulating module according to the invention.

FIG. 6 and FIG. 7 show oblique views of a thermally insulating module 20, wherein the module 20 in FIG. 6 is square and the module in FIG. 7 is rectangular with the long sides 22a being twice as long as the short sides 22b). The insulating modules 20 form a frame and are made from a polymer.

The module 20 shown in FIG. 7 comprises three connection-recesses 29a, 29b for an optical fibre on each side 22b. The recesses 29a, 29b are placed in the side's middle and at the corners 21 of the insulating module 20. The corners 21 are formed each by a quarter circle segment cutout 23 which can be attached with the modular system 1.

The module 20 in FIG. 7 comprises three connection recesses 29a, 29b at the short sides 22b each (one in the middle 29b, two at the corners 29a), and four connection recesses 29a, 29c on each long side 22a. The connection recesses 29a, 29c are arranged as in the second kind of module 202 (c.f. FIG. 3).

In the middle of the module's long sides 22a are half circle segments cutouts 23a, which can be used for attaching the module 20 with the modular system 1, too.

Figure 8:
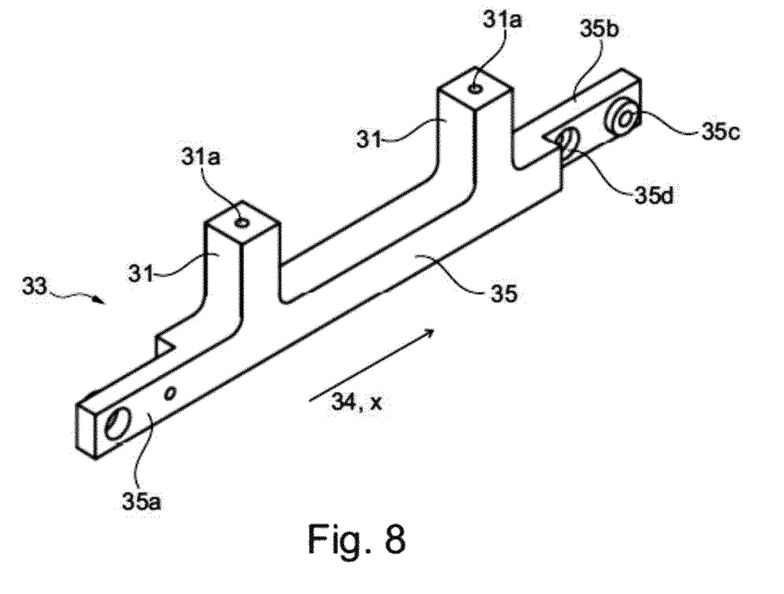

FIG. 8 an oblique view of a module-support member 33 is shown. The module support member 33 acts in the modular system 1 as a support beam for the modules 20, 201, 202, wherein the posts 31 are arranged orthogonally on said support beam 35, facing upwards (z-direction). The posts 31 comprise on an upper and a threaded recess 31a, in which a screw can engage for fixing a module 20, 201, 202 to the support member 33.

The module-support member 33 has an elongated direction of extension 34 that, when the modular system 1 is assembled, is arranged along the x-axis of the modular system 1. At least two posts 31 are arranged on the module-support member 33.

The module-support member 33 comprises a rotational-symmetric cross-section profile within any cross-section orthogonal to the direction of extent of the posts 31, wherein the rotational symmetry is particularly a point reflection.

The support member 33 has two complementary connection-sections 35a, 35b, which are for connecting with another module-support member 33 (of the same kind), or for connecting with the grid-side-to-centre member 37.

The connection section 35a, 35b comprises protrusions 35c and recesses 35d that are formed complementary such that two module support members 33 can engage in each other when assembled. This in turn provides a higher stability for the combined module support member.

The module support member 33 has the same length as the long side 22a of a rectangular module, such as for example the modules in FIG. 1, 3, 4, 5, or 7.

Figure 9:
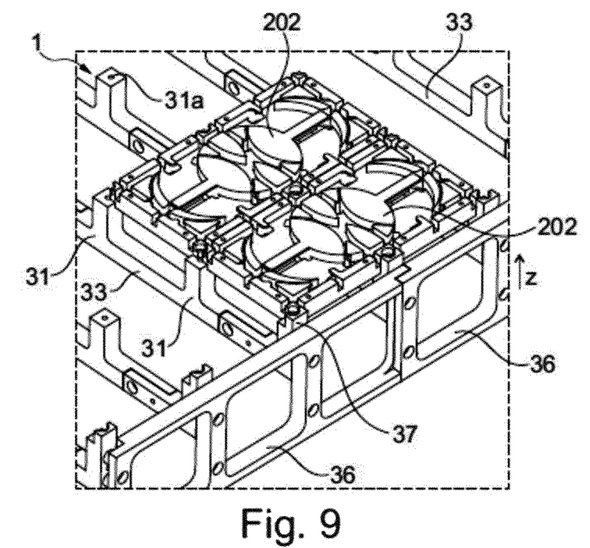
FIG. 9 a top view of a modular system with two modules of the second kind.

FIG. 9 shows an oblique view of two second kind modules 202 for receiving an optical fibre (see FIG. 3), which are attached to the modular system 1. In particular, one second kind module 202 is at one side attached to a grid-to-side member 37 and at its other side attached to the posts 31 of the module-support members 33. The second "second kind" module 202 is adjoining to the first second kind module 202 and is attached at its one side to the same posts 31 like the first "second kind" module 202 and at its other side with the other—corresponding—posts 31. It is to be seen, that the modular system 1 offers a way to use the same posts 1 for attaching different, coplanar modules 20, 201, 202. The modules 20, 201, 202 do not overlap, when arranged on the modular system 1.

Figure 10:
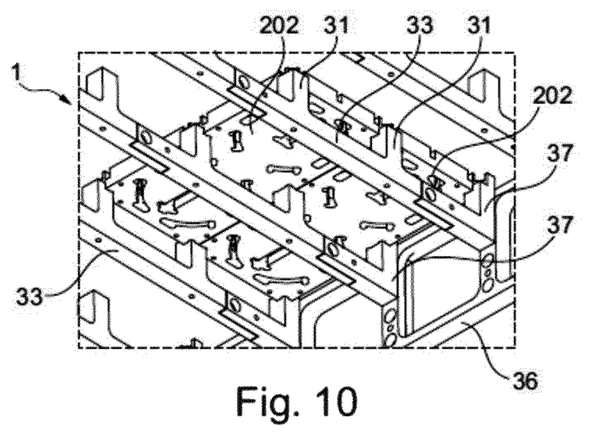
FIG. 10 a bottom view of a modular system with two modules of the second kind.

FIG. 10 is an oblique view of the system 1 shown in FIG. 9 from the opposite direction: Two "second kind" modules 202 for receiving an optical fibre (see FIG. 3) are attached to the modular system 1. From this perspective, it can be seen that the grid-side-to-centre 37 members are used to attach the module 202 with the module-support member 33 and with the frame-support members 36.

Figure 11:
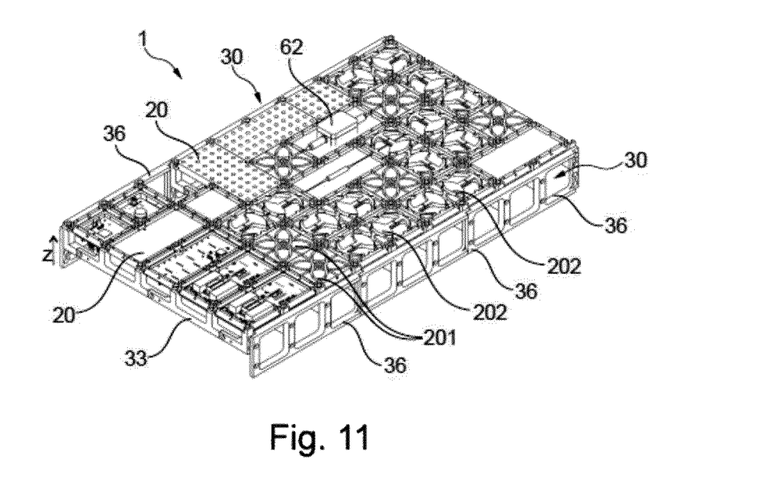
FIG. 11 a modular system according to the invention.

FIG. 11 is an oblique view of one embodiment of a modular system 1. The system's frame 30 consists of two opposing sides, which each are formed by three frame support members 36. The two sides are connected by ten rows, which each are formed by two module support members 33 forming a combined modules support member. The combined module support members are attached with their ends to one grid-side-to-centre member 37.

The modular system 1 comprises different kind of modules 20, 201, 202 including electronics for laser and photo-diodes, fibre optic component holder modules, "first kind" modules 201, "second kind" modules 202 and modules formed as threaded breadboard plates.

It is possible to mount electronic components on the side of the frame 30 as well.

Figure 12:
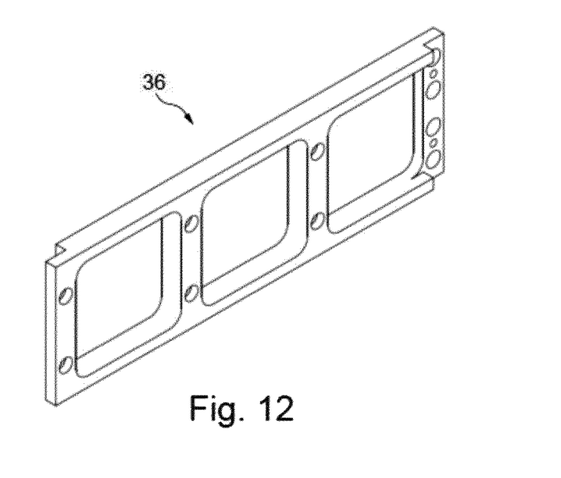
FIG. 12 a frame-support member.

FIG. 12 is an oblique view of a frame-support member 36. The frame-support member 36 has a rotational symmetry that allows it to be assembled in a modular way and to form a combined frame-support member of almost arbitrary length.

Figure 13:
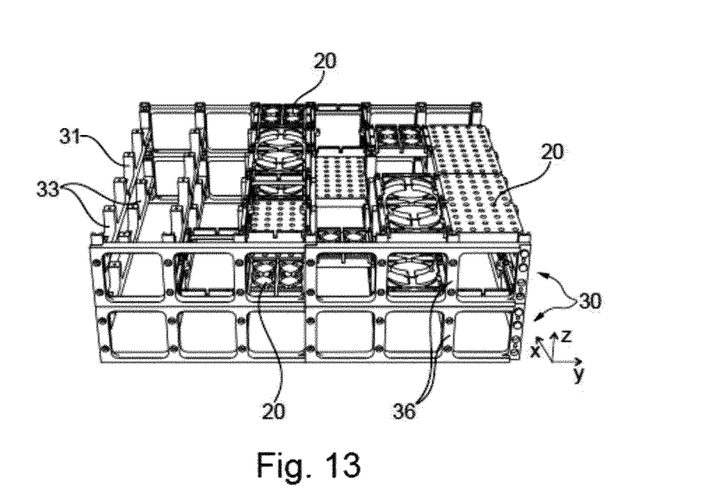
FIG. 13 a system comprising two levels of modules stacked on top of each other.

FIG. 13 shows two frames 30 arranged on top of each other, such that a particularly compact built is achieved.

Essentially two frames 30 comprising various modules 20 are stacked on top of each other such that the system 1 extends further along the z-direction rather than along the x-y plane. This construction saves space and allows for compact layouts.

Figure 14:
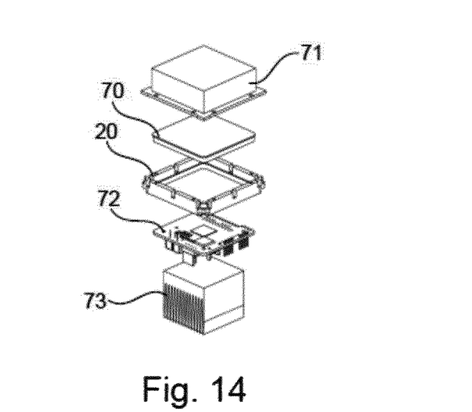
FIG. 14 an exploded view of two temperature-stabilizing module arrangements.

FIG. 14 shows an arrangement comprising a heating or cooling module 20. The exploded view shows the module 20 made from a heat-insulating polymer, a surface plate 70 made from a heat-conducting compound such as for example copper. Below the module 20 a control-electronic 72 is arranged for controlling the temperature. Yet below the control electronic 72 a heat dissipation module 73 is arranged for dissipating excess heat. As the modular system 1 comprises a free space below the modules (as the module support members 33 as well as the frame support members 36 are formed correspondingly), these additional components can be arranged below the module 20. The module 20 is covered by a cover element 71 that is designed for insulating the component arranged on the module 20.

Figure 15:
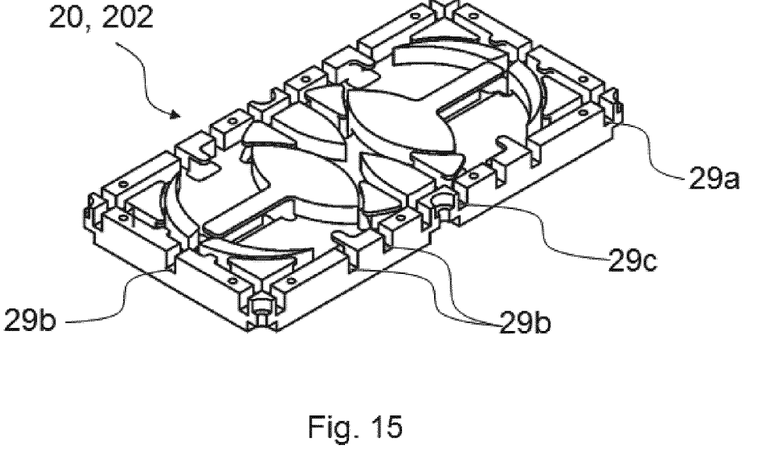
FIG. 15 a variation of the second kind of module.

FIG. 15 shows a variant of the embodiment of a module of a second kind 202 shown in FIG. 3. The explanations and disclosure of features with respect to FIG. 3 apply mutatis mutandis to the module 202 shown in FIG. 15. In addition to the embodiment in FIG. 3 the module has additional middle connection recesses 29b arranged on the long and short side of the module 202. Accordingly other modules 20, 201, 202, 204 can have such middle connection recesses 29b, such that the fibre can by guided from one module 20, 201, 202, 204 to the next.

Figure 16:
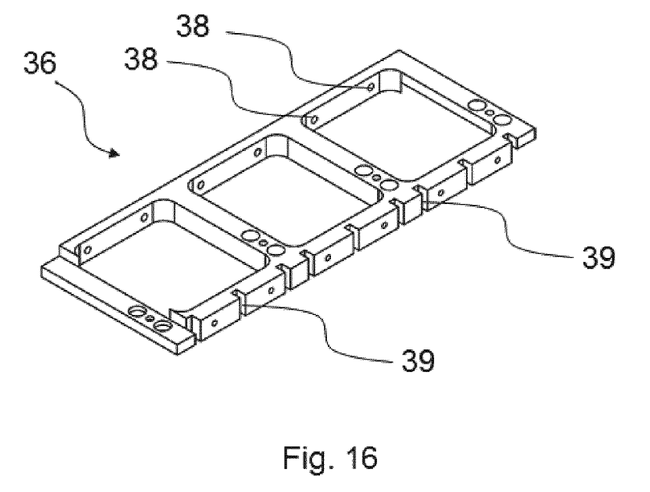
FIG. 16 a variation of a frame-support member.

In FIG. 16 a variant embodiment of a frame-support member 36 is shown. In addition to the frame-support member 36 shown in FIG. 12 the frame-support member 36 of FIG. 16 comprises recesses 39 for a fibre as well as drillings 38. The description for the embodiment shown in FIG. 12 applies to FIG. 16.

Figure 17:
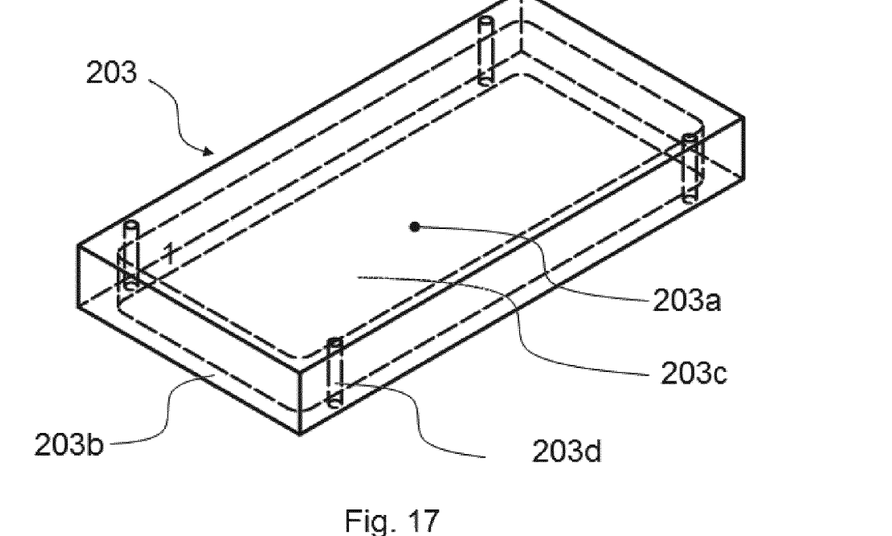
FIG. 17 a lid module.

In order to provide a thermal stabilization for optical or opto-mechanical components arranged on the modules 20 of the system, a lid module 203 as shown in FIG. 17 can be arranged on top of the module 20 (not shown) such that components arranged on the module 20 can be covered and thus thermally isolated from the surrounding air. This reduces convection based-heat transport and allows for an improved temperature stabilization. The lid module 203 has an outer contour that corresponds to the outer contour of any of the modules 20, 201, 202, 204 arranged on the system, such that the modules 20, 201, 202, 204 can be arranged next to each other and the lid module 203 does not interfere with this arrangement. The lid module 203 has a cover 203a and lid module walls 203b that enclose a volume 203c that is configured to house components arranged on the module 20, 201, 202, 204.

The lid module 203 comprises recesses in form of channels 203d at its corners, wherein the recesses 203d are configured to receive a fixing means, such as a screw for attaching the lid module 203 to an underlying module 20 (not shown) or a module-support member 33 such that the module 20 is clamped either simultaneously with or independently of the lid module 203 to the module-support member 33.

Figure 18:
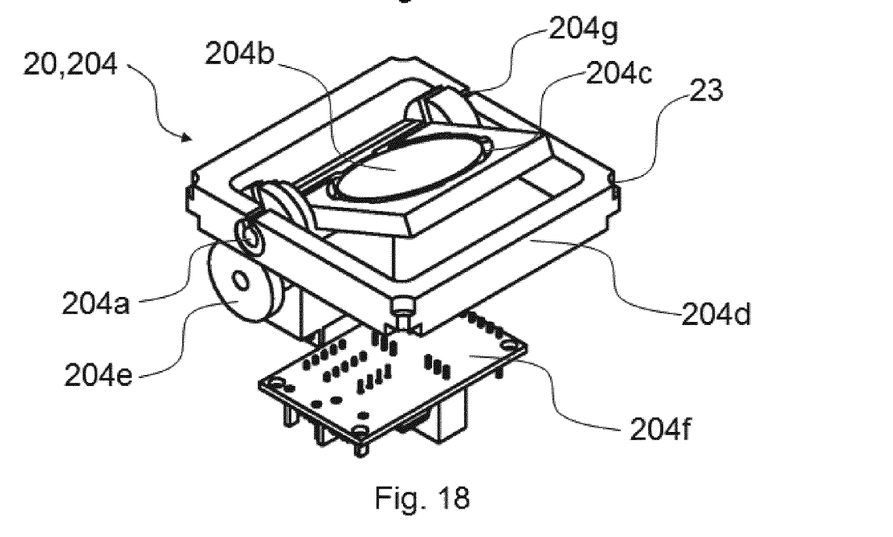
FIG. 18 an opto-mechanical polarisation controller module.

In FIG. 18 an opto-mechanical polarisation controller module 204 is shown that is adapted and configured to be attached to the modular system 1.

The four corners 21 of the opto-mechanical polarisation controller module 204 are formed each by a quarter circle segment cutout 23 that is configured and designed to be attached with the modular system 1 with a fixing means, such as a screw. When the opto-mechanical polarisation controller module 204 is fixed on the modular system 1, the quarter segment cutouts 23 are pressed down to a post 31 of a module-support member 33 (not shown) by the screw head of the screw.

The opto-mechanical polarisation controller module 204 has a fibre-receiving portion 204a through which a fibre can be inserted in order to be wound around a fibre spool 204b e.g. 1 to 5 times. The fibre spool 204b has a recess 204c for guiding and holding the fibre that is wound on the fibre spool 204b. From the fibre spool 204b the fibre is guided towards an exit portion 204g for the fibre, where the fibre leaves the opto-mechanical polarisation controller module 204.

The fibre spool 204b is arranged rotatably within a frame 204d of the opto-mechanical polarisation controller module 204. The axis of rotation is oriented along the receiving 204*a* and exit portion 204*f* for the fibre. By rotating the fibre spool 204*b* with respect to the frame 204*d* (that is fixed to the modular system) the fibre experiences a torque that leads to a change of the polarisation of the light in the fibre such that the polarisation of the light in the fibre can be controlled by the opto-mechanical polarisation controller module 204. The fibre spool 204*b* is connected to a motor 204*e* that is controlled by electronics on a printed circuit board 204*f* adapted to control the rotation and angle of the fibre spool 204*b* relative to the frame 204*d*. The above detailed examples are for illustrating the modular system. Any feature disclosed in the examples might be used also for other embodiments that are not specifically discussed in illustrations.

The invention claimed is:

1. Modular system (1) for arranging an optical fibre of an optical system in a controlled and secure manner, comprising at least the following components:
   a modular frame (30) comprising a plurality of upright posts (31), wherein the posts (31) are arranged such on the frame (30) that a next-neighbour distance of the posts (31) is identical, wherein each post (31) comprises a recess (31*a*) on the upper end,
   at least one module (20) for receiving an optical fibre, wherein the module (20) comprises at least four corners (21),
wherein the posts (31) are arranged such that up to four modules (20) can be arranged with their corners (21) non-overlapping on a single post (31),
wherein each module's corner (21) can be fixed with a fixing means on the post (31), wherein the fixing means is designed to engage in the recess (31*a*) on the upper end of the post (31) and wherein the corners (21) of each module (20) and the fixing means are designed such that the fixing means can simultaneously fix up to four non-overlappingly arranged modules (20) on a single post (31) of the frame (30).

2. Modular system, according to claim 1, wherein each module (20) comprises four corners (21) and wherein the modules (20) and the posts (31) are designed such that four modules (20) can be arranged with their corners (21) in a non-overlapping manner on a single post (31).

3. Modular system according to claim 1, wherein the posts (31) are arranged in a regular grid, such that a plurality of modules (20) can be arranged in a regular pattern on the posts (31), particularly in a rectangular, square or hexagonal fashion, particularly in at least two rows and two columns, wherein particularly the sides (22*a*, 22*b*) of the at least one module (20) each enclose an angle of 90° or 120° with each other and wherein the sides (22*b*) of the at least one module (20) are particularly of the same length.

4. Modular system according to claim 1, wherein the fixing means is a screw and wherein each corner (21) of the module (20) comprises a quarter or a third circle segment cutout (23), wherein the cutout (23) is arranged around the recess (31*a*) of the post (31), when the module (20) is arranged on the frame (30).

5. Modular system according to claim 1, wherein the frame (30) comprises straight and elongated module-support members (33), wherein the module-support members (33) are arranged with an elongated direction of extent (34) in the frame (30) along a horizontal direction, particularly the x- or y-direction of the frame (30), wherein at least two posts (31) are arranged upright, particularly in the z-direction on each module-support member (33).

6. Modular system according to claim 5, wherein each module-support member (33) comprises a rotational-symmetric cross-section profile within any cross-section orthogonal to the direction of extent of the posts (31).

7. Modular system according to claim 5, wherein each module-support member (33) comprises an elongated section (35) extending along the elongated direction of extent (34) of the module-support member (33), wherein the elongated section (35) comprises a first connection section (35*a*) at a first end of the elongated section (35) and a second connection section (35*b*) at a second end of the elongated section (35), wherein the first and second connection section (35*a*, 35*b*) are formed complementary to each other particularly such that when the first connection section (35*a*) of a first module-support member (33) and the second connection section (35*b*) of a second module-support member (33) are connected, a combined module-support member is formed that extends straight along the elongated direction of extent (35) of the first and second module-support member (33).

8. Modular system according to claim 1, wherein the frame (30) has frame-support members (36) that are arranged such that the frame-support members (36), when the modular system (1) is in an assembled state, extend lower than the module-support members (33), such that the frame (30) can be mounted on the frame-support members (36) only, such that the module-support members (33) do not touch a planar mounting surface for the modular system (1).

9. Modular system according to claim 1, wherein the at least one module (20) comprises a lower, particularly planar surface facing towards the module support member (33), wherein the at least one module (20) comprises a recess or a threaded recess on the lower surface that is configured for attaching electronic components (72, 73), particularly a photodiode circuit, a control circuitry for motors, a temperature control system, and/or a thermoelectric cooling or heating system to the lower surface of the module (20).

10. Modular system according to claim 9, wherein a first kind of module (201) of the at least one module (20) has equally long sides (22*b*) at an angle of 90°, wherein each side (22*b*) has three connection-recesses (29*a*, 29*b*), wherein a middle connection-recess (29*b*) is arranged at the middle of the side (22*b*) and the two outer connection-recesses (29*a*) are arranged symmetrically to the middle recess (29*b*), particularly at the corners (21), wherein the fibre-guiding recesses (26) are connected to the connecting-recesses (29*a*, 29*b*), wherein the fibre-guiding recesses (26, 26*a*) are formed at least partially as channels, each following an arc (26*a*), particularly a quarter circle segment, such that a fibre (61) can be arranged and guided along said arc (26*a*), wherein
   at least one arc (26*a*) connects with a first end to one of the outer connection recesses (29*a*) and ends with a second end in the centre (24*a*) or a centre area of the module surface (24), and/or
   at least one arc (26*a*) connects with its ends to the middle connection recesses (29*b*) of two adjacent sides (22*b*),
and wherein the module (201) particularly comprises fibre-guiding recesses (26) that connect the middle connection-recesses (29*b*) of opposites sides (22*b*) along a straight line.

11. Modular system according to claim 9, wherein a second kind of module (202) of the at least one module (20) has two long sides (22*a*) and two short sides (22*b*) at 90°, wherein the long sides (22*a*) are twice as long as the short side (22*b*), wherein the protruding elements (25) are arranged such on the surface (24) of the second kind of module (202) that a fibre (61) can be wrapped and guided along a path that has the shape of an eight, wherein particularly the long sides (22*a*) each have six connection-recesses (29*a*, 29*c*) arranged symmetrically around the middle of the side (22*a*), wherein two outer connection-recesses (29*a*) are arranged at the corners (21).

12. Modular system according to claim 1, wherein the at least one module (20) comprises an upper surface (24) comprising particularly upright protruding elements (25), wherein said protruding elements (25) form fibre-guiding recesses (26) for arranging and guiding an optical fibre (61), wherein the protruding elements (25) are arranged and particularly shaped rotation-symmetrically with respect to the centre (24*c*) of the surface plane (24) of the module (20) or symmetrically with respect to at least one axis of symmetry (24*a*) of the at least one module (20).

13. Fibre optic system assembly, particularly a fibre laser or a fibre optic detection system, comprising an optical fibre (61) and fibre optic components, particularly from the group of an active medium, a fibre-optic isolator, a fibre-optic coupler, a wavelength division multiplexing element, an inline polarizer, a laser diode, a pump-signal combiner, the fibre optic system assembly further comprising the modular system (1) according to claim 1, wherein the fibre (61) connecting the fibre-optic components is arranged on a plurality of modules (20, 201, 202) on the modular system (1).

14. Module (201) for a modular system (1) according to claim 1, wherein the sides (22*b*) of the module (201) enclose an angle of 90° and are of the same length, wherein the module (201) comprises four corners (21), wherein each corner (21) of the module (201) comprises a quarter circle segment cutout (23),
wherein the module (210) comprises an upper surface (23) comprising upright protruding elements (25),
wherein said protruding elements (25) form fibre-guiding recesses (26) on the upper surface (24) of the module (201) for guiding an optical fibre (61), wherein the protruding elements (25) are arranged and/or designed rotation-symmetrically or symmetrically with respect to at least one axis of symmetry (24*a*) of the at least one module (201), wherein the module (201) comprises three connection-recesses (29*a*, 29*b*) on each side (22*b*) of the module (201) to relay an optical fibre (61) to connection-recesses (29*a*, 29*b*, 29*c*) of an adjacent module (20, 201), wherein a middle connection-recess (29*b*) is at the middle of the side (22*b*) and two outer connection-recesses (29*a*) are arranged symmetrically to the middle connection-recess (29*b*), wherein the fibre-guiding recesses (26) connect to the connecting recesses (29*a*, 29*b*), wherein the fibre-guiding recesses (26) are formed at least partially as channels, each following an arc (26*a*), particularly a quarter circle segment, such that a fibre can be arranged and guided along the arc (26*a*), wherein
    at least one arc connects (26*a*) with a first end to one of the outer connection recesses (29*a*) and ends with a second end in the centre (24*c*) of the module surface (24), and/or
    at least one arc (26*a*) connects with its ends to the middle connection recesses (29*b*) of two adjacent sides (22*b*),
and wherein the module (201) particularly comprises fibre-guiding recesses (26) that connect the middle connection-recesses (29*b*) of opposites sides (22*b*) along a straight line.

15. Module (202) for a modular system according to claim 1, wherein the module (202) has two long sides (22*a*) and two short sides (22*b*) each at 90°, wherein the long sides (22*a*) are twice as long as the short sides (22*b*),
wherein the module (202) comprises four corners (21), wherein each corner (21) of the module (202) comprises a quarter circle segment cutout (23), wherein the module (202) comprises an upper surface (24) comprising particularly upright protruding elements (25),
wherein said protruding elements (25) form fibre-guiding recesses (26) on the upper surface (24) of the module (202) for arranging and relaying an optical fibre (61), wherein the protruding elements (25) are arranged rotation-symmetrically or symmetrically with respect to at least one axis of symmetry (24*a*) of the module (202),
wherein the protruding elements (25) are designed and arranged such on the surface (24) of the module (202) that a fibre (61) can be wrapped and guided along a path that has the shape of an eight, wherein particularly the long sides (22*a*) each have six connection-recesses (29*a*, 29*c*) arranged symmetrically around the middle of the side (22*a*), wherein two outer connection-recesses (29*a*) are arranged next to the corners (21) of the module (202) and wherein the module (202) particularly comprises fibre-guiding recesses (26) that connect the middle connection-recesses (29*b*) of opposites sides (22*a*) along a straight line.

\* \* \* \* \*